(12) United States Patent
Sheleheda et al.

(10) Patent No.: US 9,736,174 B2
(45) Date of Patent: *Aug. 15, 2017

(54) METHOD AND APPARATUS FOR MACHINE TO MACHINE NETWORK SECURITY MONITORING IN A COMMUNICATIONS NETWORK

(71) Applicant: AT&T Intellectual Property I, L.P., Atlanta, GA (US)

(72) Inventors: Daniel Sheleheda, Florham Park, NJ (US); Donald J. Bowen, Madison, NJ (US); Cynthia Cama, Belmar, NJ (US); Lusheng Ji, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,053

(22) Filed: Sep. 19, 2016

(65) Prior Publication Data

US 2017/0006052 A1    Jan. 5, 2017

Related U.S. Application Data

(63) Continuation of application No. 13/301,529, filed on Nov. 21, 2011, now Pat. No. 9,450,973.

(51) Int. Cl.
*H04L 29/06* (2006.01)
*H04W 12/12* (2009.01)
*H04W 84/18* (2009.01)
*H04L 12/24* (2006.01)
*H04W 4/00* (2009.01)

(52) U.S. Cl.
CPC ...... *H04L 63/1416* (2013.01); *H04L 41/0631* (2013.01); *H04W 12/12* (2013.01); *H04W 84/18* (2013.01); *H04L 63/145* (2013.01); *H04L 63/1458* (2013.01); *H04W 4/005* (2013.01)

(58) Field of Classification Search
CPC .............. H04L 63/1416; H04L 41/0631; H04L 63/1458; H04L 63/145; H04W 12/12; H04W 84/18; H04W 4/005
See application file for complete search history.

(56) References Cited

U.S. PATENT DOCUMENTS

| | | |
|---|---|---|
| 2004/0137915 A1 | 7/2004 | Diener et al. |
| 2004/0230834 A1 | 11/2004 | McCallam |
| 2006/0123479 A1 | 6/2006 | Kumar et al. |
| 2006/0195201 A1 | 8/2006 | Nauck et al. |
| 2007/0239999 A1 | 10/2007 | Honig et al. |
| 2011/0302087 A1 | 12/2011 | Crooks |
| 2012/0326858 A1 | 12/2012 | Daly et al. |

*Primary Examiner* — Robert M Morlan
*Assistant Examiner* — Mandish Randhawa

(57) ABSTRACT

A method, non-transitory computer readable medium and apparatus for providing network security monitoring in a communications network are disclosed. For example, the method receives communications traffic associated with a sensor network from a sensor that is a member of the sensor network, analyzes the communications traffic to determine if an attack is occurring on the sensor network, and generates an alarm if the attack is occurring on the sensor network.

20 Claims, 3 Drawing Sheets

METHOD AND APPARATUS FOR MACHINE TO MACHINE NETWORK SECURITY MONITORING IN A COMMUNICATIONS NETWORK

This application is a continuation of U.S. patent application Ser. No. 13/301,529, filed Nov. 21, 2011, now U.S. Pat. No. 9,450,973, which is herein incorporated by reference in its entirety.

The present disclosure relates generally to machine to machine communications and, more particularly, to a method and apparatus for machine to machine network security monitoring in a communications network.

BACKGROUND

Machine to machine (M2M) and wireless sensor networks have emerged and are expected to continue to expand into almost every aspect of our lives. As the M2M wireless sensor networks become more commonplace, the risk of attacks on these networks will grow. For example, a directed attack could disable a security system of a home or a business and allow an intruder to enter a home or business, activate a false fire alarm and so forth.

Currently, M2M and wireless sensor networks have a minimal level of security. For example, they may provide such measures as transport encryption. However, the standards used today lack higher level security monitoring functions needed to detect a cyber attack or a malware infection.

SUMMARY

In one embodiment, the present disclosure provides a method, non-transitory computer readable medium and apparatus for providing security monitoring in a communications network. For example, the method receives communications traffic associated with a sensor network from a sensor that is a member of the sensor network, analyzes the communications traffic to determine if an attack is occurring on the sensor network, and generates an alarm if the attack is occurring on the sensor network.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and apparatus for machine to machine network security monitoring in a communications network. Machine to machine (M2M) and wireless sensor networks have emerged and are expected to continue to expand into almost every aspect of our lives. M2M and wireless sensor networks may support a variety of home and office automation, security monitoring, smart energy deployment and manufacturing applications. It should be noted that this is not an exhaustive list.

M2M and wireless sensor networks typically comprise of low cost, low power wireless networks that use small microprocessor devices, such as for example, intelligent sensors, to monitor and control aspects of the application environment. Various types of communication protocols, such as for example IEEE 802.15-4 and ZigBee, may be used in M2M and wireless sensor networks.

As the M2M wireless sensor networks become more commonplace, the risk of attacks on these networks will likely grow. For example, a directed attack could disable a security system of a home or a business and allow an intruder to enter a home or business, activate a false fire alarm and so forth.

Currently, M2M and wireless sensor networks have a minimal level of security. For example, the standards used today for M2M and wireless sensor networks may provide a limited amount of security measures. For example, they may provide such measures as transport encryption. However, the standards used today lack higher level security monitoring functions needed to detect a cyber attack or a malware infection. The present disclosure provides machine to machine network security monitoring in a communications network that provides a higher level of security than currently available.

Figure 1:
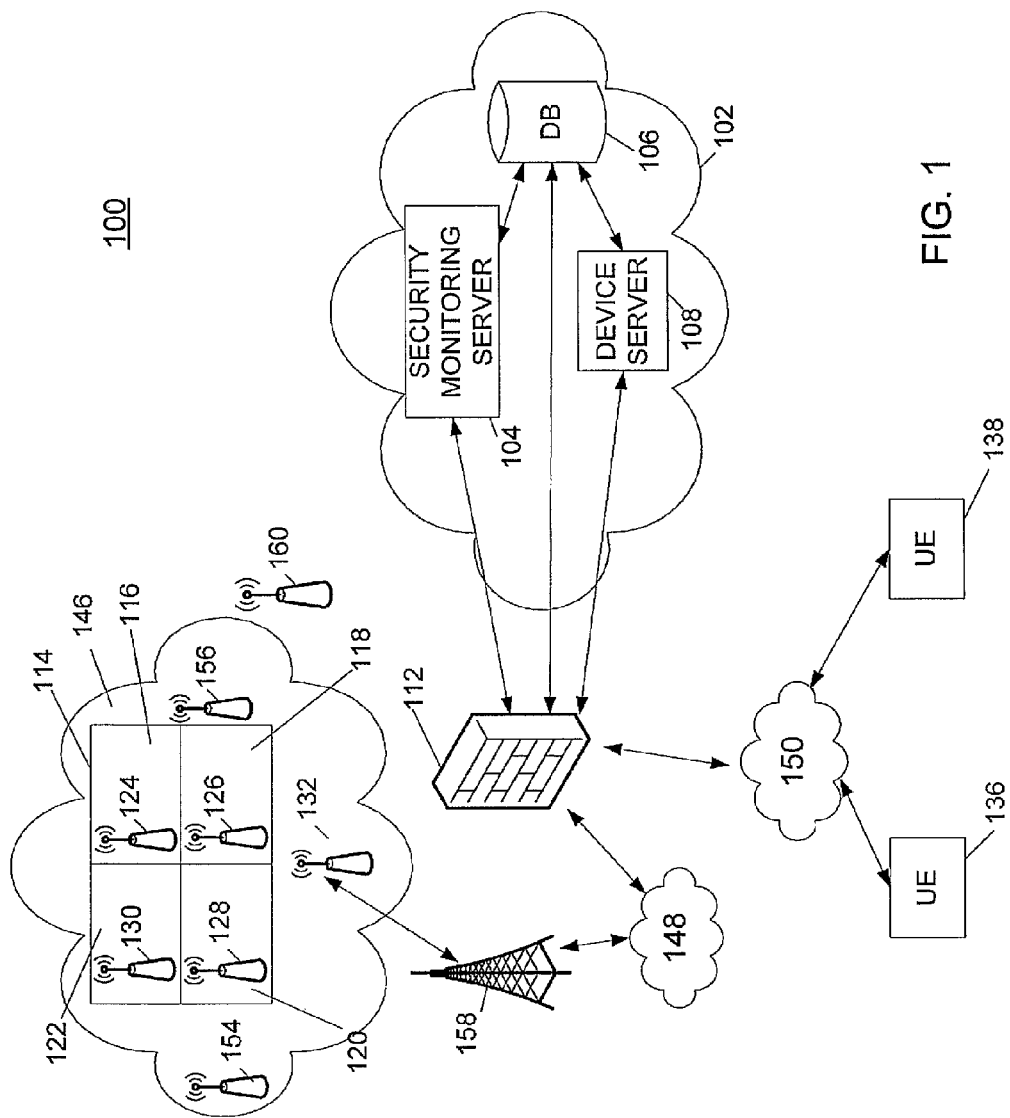
FIG. 1 illustrates one example of a communications network of the present disclosure.

FIG. 1 is a block diagram depicting one example of a communications network 100. The communications network 100 may be any type Internet Protocol (IP) network such as an Internet Protocol (IP) Multimedia Subsystem (IMS) network, a wireless network, a broadband cellular data network, a long term evolution (LTE) network, and the like, related to the current disclosure. It should be noted that an IP network is broadly defined as a network that uses Internet Protocol to exchange data packets. Additional exemplary Internet protocol (IP) networks include Voice over Internet Protocol (VoIP) networks, Service over Internet Protocol (SoIP) networks, and the like. The present disclosure is not limited to any particular network architecture.

In one embodiment, the network 100 may comprise a core network 102. The core network 102 may be in communication with one or more access networks 148 and 150. The access networks 148 and 150 may include a wireless access network, a cellular access network, a Publicly Switched Telephone Network (PSTN) access network, a cable access network, a wired access network and the like. In one embodiment, the access networks 148 and 150 may all be different types of access networks, may all be the same type of access network or some access networks may be the same type of access network and other may be different types of access networks. The core network 102 and the access networks 148 and 150 may be operated by different service providers, the same service provider or a combination thereof. In one embodiment, a firewall 112 may be included between the core network 102 and the access networks 148 and 150.

In one embodiment, the access network 150 may be in communication with one or more user endpoints (also referred to as "endpoints" or "UE") 136 and 138. The endpoints 136 and 138 may be any type of endpoint device including but not limited to, for example, a smart phone, a cellular telephone, a laptop, a tablet device, a desktop computer, a web enabled television, and the like.

In one embodiment, the access network 148 may be in communication with one or more wireless networks 146. In one embodiment, the wireless network 146 may be a personal area network, a machine to machine network, a sensor network. The personal area network may use any type of communications protocol associated with personal area networks to communicate between devices within the wireless network 146. For example, the devices within the wireless network 146 may communicate using a ZigBee® protocol, a Bluetooth® protocol, an ANT® protocol, a Z-Wave protocol and the like.

In one embodiment, the wireless network 146 may include a customer premise 114. For example, the customer premise may be a home or a business location. Within the customer premise 114, there may be one or more locations 116, 118, 120 and 122. In one embodiment, the one or more locations 116, 118, 120 and 122 may be different rooms or different areas within the customer premise 114. Some of the locations 116, 118, 120 or 122 may also be outside the customer premise 114, for example, around the yard of the customer premise 114. Although FIG. 1 illustrates a single customer premise 114 and four locations 116, 118, 120 or 122, it should be noted that any number customer premises and locations may be used.

In one embodiment, each one of the locations 116, 118, 120 and 122 may have a respective sensor 124, 126, 128 and 130. It should be noted that a sensor may be defined as a simple device where its primary function is to determine whether some event has occurred, i.e., the sensor is specifically tasked to detect the occurrence of the event. For example, the sensor may be a security sensor that is deployed to detect whether a door is open, whether a window is open, whether an intruder is detected, whether motion of an object is detected within an area, whether a leak is detected, whether some item in a refrigerator has run out and the like. Notably, the sensors used herein are not intended to encompass computers with graphical user interfaces. In one embodiment, the sensors 124, 126, 128 and 130 may be deployed as a stand-alone device or as part of an appliance or other apparatus. The sensors 124, 126, 128 and 130 may be used in machines that use M2M communications.

In one embodiment, the wireless network 146 also includes a coordinator sensor 132. The coordinator sensor 132 communicates with all of the other sensors 124, 126, 128 and 130 at the customer premise 114. In one embodiment, the coordinator sensor 132 may further have the ability to communicate with a gateway 158 to communicate over the access network 148 with the core network 102.

In one embodiment, the wireless network 146 may also include one or more security sensors 154 and 156. It should be noted that although only two security sensors are illustrated in FIG. 1 as an example, any number of security sensors may be deployed. In one embodiment, the sensors 124, 126, 128 and 130 may also serve as security sensors.

In one embodiment, some of the devices may be incorporated into existing hardware. For example, a cable set top box at the customer premise 114 may be configured to serve as one or more of the coordinator sensor 132, the one or more security sensors 154 and 156 or the gateway 158.

The one or more security sensors 154 and 156 may "listen" to all communications traffic, including traffic that occurs between the sensors 124, 126, 128 and 130 and the coordinator sensor 132, traffic that is not intended for the one or more security sensors 154 and 156 and traffic that is outside of, but within range of, the wireless network 146. For example, the security sensors 154 and 156 may record each communication that occurs and the identification of the devices, e.g., sensors, involved in each communication. The security sensors 154 and 156 may store these records in a local memory and forward them to the coordinator sensor 132. The coordinator sensor 132 may then forward the recorded communications traffic to the core network 102 for analysis.

In one embodiment, the coordinator sensor 132 and/or the one or more security sensors 154 and 156 may incorporate cognitive radio technology. For example, using cognitive radio technology, the coordinator sensor 132 and/or the one or more security sensors 154 and 156 may intelligently detect whether any portion of the communications spectrum is available and temporarily latch into or out of it without interfering with the transmission of other users. This allows for more efficient use of the communications spectrum.

In one embodiment, the communications traffic that is recorded may include various type of information. For example, the communications traffic may provide information such as when the communication occurred, between which sensors the communications occurred, what type of communication occurred and the like.

In one embodiment, the core network 102 may include a security monitoring server 104, a database (DB) 106 and a device server 108. In one embodiment, the security monitoring server 104 may be responsible for analyzing the communications traffic recorded by the security sensors 154 and 156. For example, the security monitoring server 104 is able to analyze the communications traffic to detect potential security threats such as, for example, a denial of service attack, a message replay attack, a malware attack, a device insertion attack, a war driving attack, and the like. In one embodiment, the analysis may be based on a variety of methods, such as for example, algorithms, heuristics, comparisons to historical patterns and the like.

In one embodiment, a denial of service attack is identified by analyzing a volume of communications traffic that is recorded. For example, a historical baseline of traffic volume may be tracked and stored in the database 106. In one embodiment, a comparison may be made on a periodic basis, e.g., every hour, every day or every week, between the recorded communications most recently received from the wireless network 146 and the historical baseline stored in the database 106. If the volume of traffic in the recorded communications is higher than the historical baseline stored in the database 106 (e.g., 25% more than the historical baseline, 50% more than the historical baseline, 75% more than the historical baseline, 100% more than the historical baseline, and so on), the security monitoring server 104 may determine that a denial of service attack may be occurring. In one embodiment, a predetermined threshold, e.g., greater than 10%, may be used to reduce false positives and to reduce the effects of noise in the data.

In one embodiment, a message replay attack is identified by analyzing the communications traffic to see if a message is being repeated over and over again. For example, a message replay attack attempts to capture messages by snooping on the wireless network 146 and then replaying those messages randomly in an attempt to initiate an unauthorized command. For example, a snooping device may capture a communication message from a device that instructs a front door to open. The communication message may be encrypted or not encrypted. The snooping device may then replay the communication message over and over again in an attempt to open the front door. It should be noted that the snooping device may not even know the actual function associated with the replayed communication message, but is hoping that by randomly replaying the communication message, a legitimate function is performed such that an intruder can then exploit the result of the legitimate function being performed.

In one embodiment, communications traffic that is occurring outside of the protected wireless network 146 may be analyzed. As noted above, the one or more security sensors 154 and 156 may listen to and record communications traffic that is not intended for the one or more security sensors 154 and 156 and occurring outside of, but within range of, the wireless network 146. Wardriving attacks may be detected based upon the communications traffic that is recorded by the one or more security sensors 154 and 156 on different frequencies and channels within range of the wireless network 146. In one embodiment, wardriving attacks may be defined as the act of searching for Wi-Fi wireless networks by a person in a moving vehicle using a portable computer, smartphone or personal digital assistant.

As a result, the security monitoring server 104 may analyze the communications traffic to see if a particular message is being repeated over and over again and determine that a message replay attack is occurring.

In addition, the security monitoring server 104 may analyze from which device the communications are being transmitted. For example, the security monitoring server 104 may know that an open door command typically comes from the sensor 128. However, if the security monitoring server 104 detects the same command coming from a "promiscuous" sensor (e.g., any one of the sensors shown in FIG. 1 or using sensor 154 as an illustrative example), then the security monitoring server 104 may determine that a message replay attack is occurring.

In one embodiment, a malware attack, e.g., an attempt to insert malicious codes, may be identified by analyzing patterns in the communications traffic. For example, historical traffic patterns of communications within the wireless network 146 may be stored in the database 106. For example, the historical traffic patterns may include which sensors usually communicate with one another, when sensors typically issue communications messages, an order of communications between multiple sensors, how many times a sensor typically communicates within a given time period, what types of communications that are typically issued by a sensor and the like. It should be noted that this is not an exhaustive list.

Based on the historical traffic patterns, the security monitoring server 104 may compare the recorded communications traffic most recently received from the wireless network 146 to determine if any unusual patterns of communication are occurring within the wireless network 146. For example, if sensors 124 and 128 usually communicate with one another, but all of a sudden a new sensor, e.g., the promiscuous sensor attempts to communicate with sensors 124 and 128, then the security monitoring server 104 may determine that a malware attack is occurring. In another example, if the sensor 126 is issuing unidentified commands, then the security monitoring server 104 may determine that a malware attack is occurring.

In one embodiment, a device insertion attack may be identified by analyzing which devices are communicating in the communications traffic that has been recorded. For example, based on the communications, the security monitoring server 104 may know the topology of the wireless network 146. In other words, the security monitoring server 104 may know which devices are members or member sensors of the wireless network 146. As a result, if the security monitoring server 104 detects a communication from a new sensor, e.g., the promiscuous sensor 160, that has not been previously associated or registered with the wireless network 146, then the security monitoring server 104 may determine that a device insertion attack is occurring.

In addition, the security monitoring server 104 may be responsible for sending notifications or an alarm to a subscriber's endpoint device 136 or 138 if a security threat is detected. For example, the alarm may be an email, a text message, a Short Message Service (SMS) message, a phone call or the like.

In one embodiment, the database 106 may store all of the recorded communications traffic from the wireless network 146, as discussed above. In addition, the database 106 may store various information about each one of the sensors 124, 126, 128 and 130. For example, the information may include information such as a sensor's media access control (MAC) address, the type of technology supported, the type of communication protocols supported, historical information such as when and where the sensor has been previously manufactured, purchased, installed, and the like.

In one embodiment, the database 106 may also store configuration data about the sensors 124, 126, 128 and 130. As a result, if the configuration data of any sensors within the wireless network 146 become corrupted or lost, the sensors may be remotely configured using the configuration data stored in the database 106. In one embodiment, configuration information may include an identification (ID) of the wireless network 146 that the sensor is associated with, an encryption key, a network address of the coordinator sensor 132 and the like.

In one embodiment, the device server 108 may collect data and the recorded communications from the sensors 124, 126, 128 and 130. The data may then be stored in the database 106 such that the information may be analyzed by the security monitoring server 104 as discussed above. The collected data may include, for example, communications transmitted by the sensors, when a particular sensor is triggered, a date and time stamp, topology information of the wireless network 146 and the like.

Although only a single security monitoring server 104, a single database 106 and a single device server 108 are illustrated, it should be noted that more than one security monitoring server, database and device server may be deployed. In addition, although the security monitoring server 104, the database 106 and the device server 108 are illustrated as all being deployed in the core network 102, that the security monitoring server 104, the database 106 and the device server 108 may be located in any one of the networks, such as for example, the access networks 148 and 150 or the wireless network 146. In addition, it should be noted that one or more of the security monitoring server 104, the database 106 or the device server 108 may be remotely located from one another in different locations, e.g., in the wireless network 146, in one of the access networks 148 or 150, or even at a third party site.

In one embodiment, the network 100 illustrated by FIG. 1 provides machine to machine network security monitoring in a communications network. For example, in addition to simple encryption methods for communications, the network 100 provides a higher level of detection of security threats to the wireless network 146. As a result, security threats can be addressed at early stages of the threat and sometimes even before they fully developed into an attack, e.g., detecting the threat when the malicious party is initially probing the wireless network.

It should be noted that the network 100 has been simplified. For example, the network 100 may include other network elements (not shown) such as border elements, routers, switches, call control elements, policy servers, security devices, a content distribution network (CDN) and the like.

Figure 2:
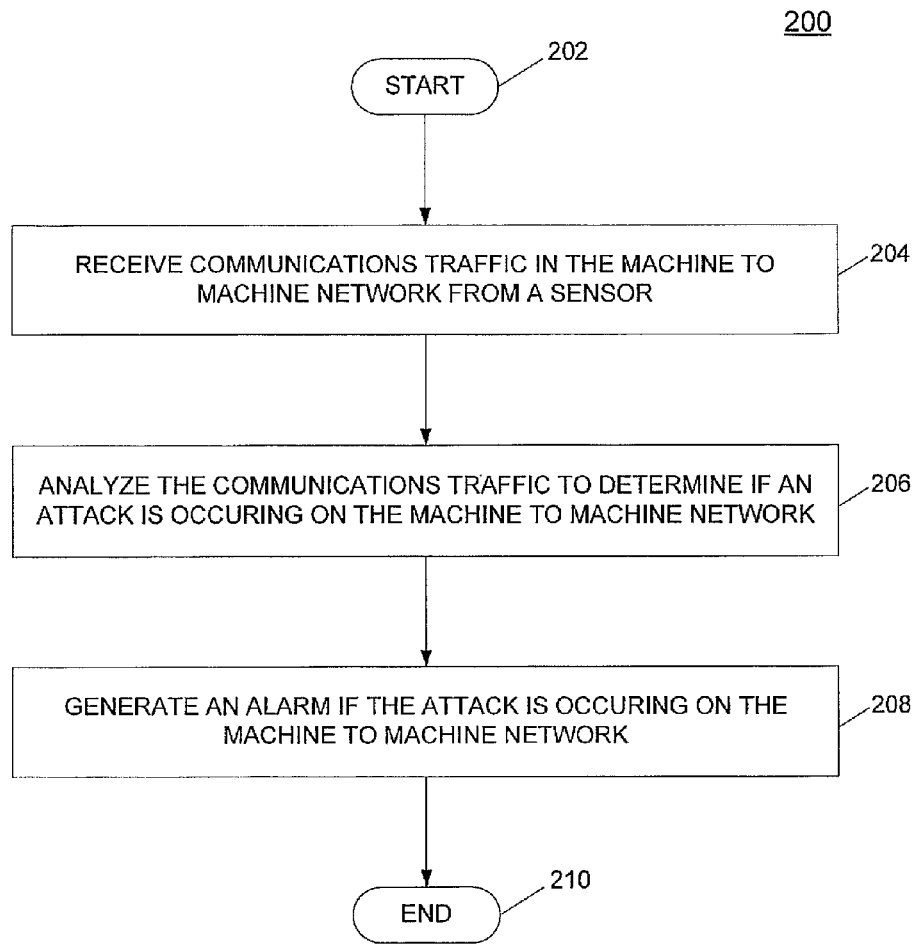
FIG. 2 illustrates an example flowchart of one embodiment of a method for machine to machine network security monitoring in a communications network.
Figure 3:
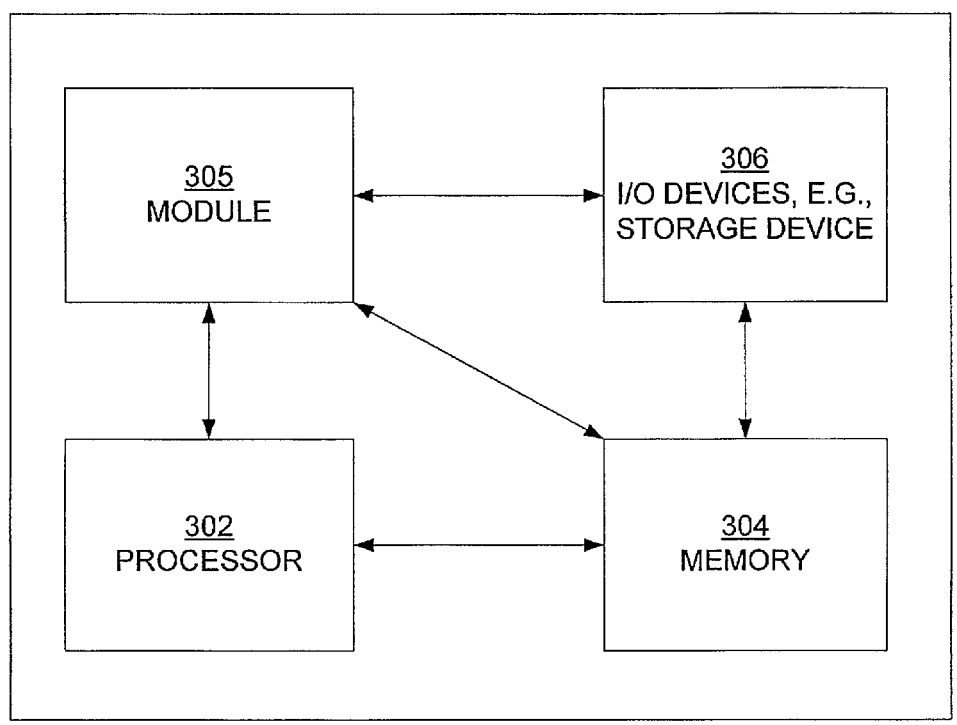
FIG. 3 illustrates a high-level block diagram of a general-purpose computer suitable for use in performing the functions described herein.

FIG. 2 illustrates a flowchart of a method 200 for providing machine to machine network security monitoring in a communications network. In one embodiment, the method 200 may be performed by the security monitoring server 104 or a general purpose computer as illustrated in FIG. 3 and discussed below.

The method 200 begins at step 202. At step 204, the method 200 receives communications traffic in the machine to machine network from a sensor. For example, the coordinator sensor 132 may gather all of the communications traffic in the wireless network 146 and then forward them to the core network 102. For example, the communications traffic may be obtained from the coordinator sensor 132 by the device server 108. The device server 108 may then store the communications traffic in the database 106, which then may be accessed by the security monitoring server 104. In one embodiment, the communications traffic is sent by each one of the sensors, e.g., the sensors 124, 126, 128 and 130, directly to the device server 108.

In one embodiment, the communications traffic may be gathered on a periodic basis. For example, the communications traffic may be gathered every hour, every day, every week and the like. In another embodiment, the communications traffic may be gathered continuously.

As noted above, the communications traffic that is recorded may include various type of information. For example, the communications traffic may provide information such as when the communication occurred, the identification of the sensors involved in the communication, what type of communication occurred, and the like.

At step 206, the method 200 analyzes the communications traffic to determine if an attack is occurring on the machine to machine network. As discussed above, the security monitoring server 104 is able to analyze the communications traffic to detect potential security threats such as, for example, a denial of service attack, a message replay attack, a malware attack, a device insertion attack, and the like.

In one embodiment, a denial of service attack is identified by analyzing an amount or a volume of communications traffic that is recorded. For example, a historical baseline of traffic volume is tracked and stored in the database 106. In one embodiment, a comparison is made on a periodic basis, e.g., every hour, every day or every week, between the recorded communications most recently received from the wireless network 146 and the historical baseline stored in the database 106. If the volume of traffic in the recorded communications is unusually higher than the historical baseline stored in the database 106, the security monitoring server 104 may determine that a denial of service attack may be occurring. In one embodiment, a predetermined threshold, e.g., greater than 10%, may be used to reduce false positives and reduce the effects of noise in the data.

In one embodiment, a message replay attack is identified by analyzing the communications traffic to see if a message is being repeated over and over again. For example, a message replay attack attempts to capture messages by snooping on the wireless network 146 and then replaying those "captured" messages randomly in attempt to initiate an unauthorized command. For example, a snooping device may capture a communication message from a device that instructs a front door to open. The snooping device may then replay the message over and over again in an attempt to open the front door. As a result, the security monitoring server 104 may analyze the communications traffic to see if a particular message is being repeated over and over again and determine that a message replay attack is occurring.

In addition, the security monitoring server 104 may analyze from which device(s) the communications are being transmitted. For example, the security monitoring server 104 may know that an open door command typical originates from the sensor 128. However, if the security monitoring server 104 detects the same command coming from a promiscuous sensor 160, then the security monitoring server 104 may determine that a message replay attack is occurring.

In one embodiment, a malware attack is identified by analyzing patterns in the communications traffic. For example, historical traffic patterns of communications within the wireless network 146 are stored in the database 106. For example, the historical traffic patterns may include which sensors usually communicate with one another, when sensors typically issue communications, an order of communications between multiple sensors, how many times a sensor typically communicates within a given time period, what types of communications that are typically issued by a sensor, and the like.

Based on the historical traffic patterns, the security monitoring server 104 may compare the recorded communications traffic most recently received from the wireless network 146 to determine if any unusual patterns of communications are occurring within the wireless network 146. For example, if sensors 124 and 128 usually communicate with one another, but all of a sudden a new sensor, e.g., the promiscuous sensor 160 attempts to communicate with sensors 124 and 128, then the security monitoring server 104 may determine that a malware attack is occurring. In another example, if the sensor 126 is issuing unidentified commands, then the security monitoring server 104 may determine that a malware attack is occurring.

In one embodiment, a device insertion attack is identified by analyzing which devices are communicating in the communications traffic that has been recorded. For example, based on the communications, the security monitoring server 104 may know the topology of the wireless network 146. In other words, the security monitoring server 104 may know which devices are member sensors of the wireless network 146. As a result, if the security monitoring server 104 detects a communication from a new sensor, e.g., the promiscuous sensor 160 that is not registered with the wireless network, then the security monitoring server 104 may determine that a device insertion attack is occurring.

At step 208, the method 200 generates an alarm if the attack is occurring on the machine to machine network. For example, the security monitoring server 104 may be responsible for sending notifications or an alarm to a subscriber's endpoint device 136 or 138 if a security threat is detected. For example, the alarm can be either an email, a text message, an SMS message, a phone call (e.g., a pre-recorded message of a particular type of threat allegedly in progress), or the like. The method 200 then proceeds to step 210, where the method 200 ends.

It should be noted that although not explicitly specified, one or more steps of the method 200 described above may include a storing, displaying and/or outputting step as required for a particular application. In other words, any data, records, fields, and/or intermediate results discussed in the method can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer or computing device suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing machine to machine network security monitoring in a communications network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed method. In one embodiment, the present module or process 305 for providing machine to machine network security monitoring in a communications network can be loaded into memory 304 and executed by processor 302 to implement the functions as discussed above. As such, the present method 305 for providing machine to machine network security monitoring in a communications network (including associated data structures) of the present disclosure can be stored on a non-transitory (physical and tangible) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating an alarm, the method comprising:
   receiving, by a processor, communications traffic associated with a sensor network at a customer premises from a security sensor that monitors an area within the customer premises, wherein the security sensor is a member of the sensor network, wherein the communications traffic comprises communications between sensors of the sensor network, wherein the communications traffic is recorded and stored in a sensor information database;
   analyzing, by the processor, the communications traffic to determine when an attack is occurring on the sensor network, wherein the analyzing comprises comparing the communications traffic to historical communications traffic patterns, wherein the historical communications traffic patterns comprise: which sensors communicate with one another, when a sensor issues a communication message, and a type of communication that is issued by the sensor; and
   generating, by the processor, the alarm when the attack is occurring on the sensor network.

2. The method of claim 1, wherein the analyzing is performed by the processor of a security monitoring server in a communications network.

3. The method of claim 1, wherein the analyzing further comprises:
   determining when a topology of the sensor network has changed based upon the communications traffic.

4. The method of claim 1, wherein the analyzing further comprises:
   detecting an unusual pattern of communications in the communications traffic.

5. The method of claim 1, wherein the attack comprises a denial of service attack.

6. The method of claim 1, wherein the attack comprises a message replay attack.

7. The method of claim 1, wherein the attack comprises a malware attack.

8. The method of claim 1, wherein the attack comprises a device insertion attack.

9. The method of claim 1, wherein the alarm is sent to a subscriber endpoint.

10. A non-transitory computer-readable medium storing a plurality of instructions, which when executed by a processor, cause the processor to perform operations for generating an alarm, the operations comprising:
    receiving communications traffic associated with a sensor network at a customer premises from a security sensor that monitors an area within the customer premises, wherein the security sensor is a member of the sensor network, wherein the communications traffic comprises communications between sensors of the sensor network, wherein the communications traffic is recorded and stored in a sensor information database;
    analyzing the communications traffic to determine when an attack is occurring on the sensor network, wherein the analyzing comprises comparing the communications traffic to historical communications traffic patterns, wherein the historical communications traffic patterns comprise: which sensors communicate with one another, when a sensor issues a communication message, and a type of communication that is issued by the sensor; and
    generating the alarm when the attack is occurring on the sensor network.

11. The non-transitory computer-readable medium of claim 10, wherein the analyzing further comprises:
    determining when a topology of the sensor network has changed based upon the communications traffic.

12. The non-transitory computer-readable medium of claim 10, wherein the analyzing further comprises:
    detecting an unusual pattern of communications in the communications traffic.

13. The non-transitory computer-readable medium of claim 10, wherein the attack comprises a denial of service attack.

14. The non-transitory computer-readable medium of claim 10, wherein the attack comprises a message replay attack.

15. The non-transitory computer-readable medium of claim 10, wherein the attack comprises a malware attack.

16. An apparatus for generating an alarm, the apparatus comprising:
    a processor; and
    a non-transitory computer-readable medium storing a plurality of instructions which, when executed by the processor, cause the processor to perform operations, the operations comprising:

receiving communications traffic associated with a sensor network at a customer premises from a security sensor that monitors an area within the customer premises, wherein the security sensor is a member of the sensor network, wherein the communications traffic comprises communications between sensors of the sensor network, wherein the communications traffic is recorded and stored in a sensor information database;

analyzing the communications traffic to determine when an attack is occurring on the sensor network, wherein the analyzing comprises comparing the communications traffic to historical communications traffic patterns, wherein the historical communications traffic patterns comprise: which sensors communicate with one another, when a sensor issues a communication message, and a type of communication that is issued by the sensor; and generating the alarm when the attack is occurring on the sensor network.

17. The apparatus of claim 16, wherein the analyzing further comprises:
determining when a topology of the sensor network has changed based upon the communications traffic.

18. The apparatus of claim 16, wherein the analyzing further comprises:
detecting an unusual pattern of communications in the communications traffic.

19. The apparatus of claim 16, wherein the attack comprises a denial of service attack.

20. The apparatus of claim 16, wherein the attack comprises a message replay attack.

* * * * *